(12) United States Patent
Klingman

(10) Patent No.: US 6,425,122 B1
(45) Date of Patent: Jul. 23, 2002

(54) SINGLE STEPPING SYSTEM AND METHOD FOR TIGHTLY COUPLED PROCESSORS

(76) Inventor: Edwin E. Klingman, 3000 Highway 84, San Gregorio, CA (US) 94074

(*) Notice: Subject to any disclaimer, the term of this patent is extended or adjusted under 35 U.S.C. 154(b) by 0 days.

(21) Appl. No.: 09/339,010

(22) Filed: Jun. 23, 1999

Related U.S. Application Data (63) Continuation-in-part of application No. 09/303,010, filed on Apr. 30, 1999, which is a continuation-in-part of application No. 08/925,991, filed on Sep. 9, 1997, now Pat. No. 6,021,453, which is a continuation-in-part of application No. 08/846,118, filed on Apr. 24, 1997, now Pat. No. 5,860,021, which is a continuation-in-part of application No. PCT/US98/08224, filed on Apr. 23, 1998.

(51) Int. Cl.[7] ................................................ G06F 9/44
(52) U.S. Cl. ........................................ 717/124; 717/127
(58) Field of Search ................................ 717/124, 127; 714/38, 39

(56) References Cited

U.S. PATENT DOCUMENTS 5,394,544 A * 2/1995 Motoyama et al. ............ 714/38
5,682,328 A * 10/1997 Roeber et al. ................ 714/39

* cited by examiner

Primary Examiner—Gregory Morse
Assistant Examiner—John Q. Chavis
(74) Attorney, Agent, or Firm—Oppenheimer Wolff & Donnelly LLP; Claude A.S. Hamrick; Anthony B. Diepenbrock (57) ABSTRACT

A method for controlling the execution of a sole target processor or a target processor embedded in a chain of target processor units by a host-processor. The target processor unit includes a shared control register, a shared memory accessible by both the target and host processor and a code memory alterable by the host processor and containing the target processor program. The shared control register includes a single step flag to indicate that the host processor is setting the single step mode of operation for the target processor. The shared control register further includes a clock inhibit flag to permit the target processor to stop execution. Clearing the clock inhibit flag releases the target processor to execute the program in the code memory during which the target processor tests the single step flag to determine whether it should stop execution after one instruction has been executed. If the flag is set the target processor reports its instruction pointer to the host processor via the shared memory and stops.

24 Claims, 9 Drawing Sheets

SINGLE STEPPING SYSTEM AND METHOD FOR TIGHTLY COUPLED PROCESSORS

CROSS REFERENCE TO RELATED APPLICATIONS

This application is a continuation-in-part of prior U. S. application Ser. No. 09/303,010, filed Apr. 30, 1999 and entitled "An Integrated Breakpoint System and Method For Tightly Coupled Processors, And Capable Of Supporting A Chain of Processors," which is a continuation-in-part of prior U.S. application Ser. No. 08/925,991 filed on Sep. 9, 1997, and entitled "A Microprocessor Unit For Use in An Indefinitely Extensible Chain of Processor with Self-Propagation Of Code and Data From The Host End, Self-Determination Of Chain Length and ID, (And With Multiple Orthogonal Channels and Coordination Ports)," which is a continuation-in-part of U.S. application Ser. No. 08/846,118, filed Apr. 24, 1997 (now U.S. Pat. No. 5,860,021) and its corresponding International Application No. PCT/US98/08224, filed Apr. 23, 1998, entitled "Single Chip Microcontroller Having Downloadable Memory Organization Supporting "Shadow" Personality, Optimized For Bi-Directional Data Transfers Over a Communication Channel" all of which applications are incorporated herein by reference.

BACKGROUND OF THE INVENTION

1. Field of Invention

The present invention relates generally to methods for debugging a program on a processor, and more particularly to a method by which a host processor can control the execution of a tightly coupled target processor such that the target processor executes one instruction at a time, with the host processor being capable of inspecting target processor information between each instruction.

2. Description of the Prior Art

When a new program is written it is desirable to determine that it operates correctly. One way to ensure that a new program operates correctly is by setting a breakpoint at a known place in the program. Conditions are then set up so that the program will execute on the processor at normal speed until it encounters the breakpoint and stops. Once the execution stops, the user can observe important information in the program for correctness. Another way to help ensure that the program operates correctly and which allows more information to be collected about the operation of the program, is to allow a single instruction at a time to execute on the target processor. This practice of single-stepping the program allows the user to move slowly through the program flow observing the effects on system resources and locating bugs and errors that cannot be easily observed during full speed execution of the program. Using both breakpointing and single-stepping, the user can observe much about what the program is doing and take corrective steps if the program makes an error.

One kind of support for these modes of debugging has been to employ a host processor system to help in the debugging process of a program on a processor called the target processor. The host processor system supplies the input and output devices needed by the programmer to debug the program on the target processor and an executive routine that operates independently of the single-stepping process. The executive typically allows the user to examine and display resources on a display device and waits for user feedback from an input device, such as a mouse or keyboard, to re-enter the single-stepping process for the next step.

In order for the host processing system to enable the programmer to set breakpoints and perform single-stepping operations, a special version of the target processor and a special interface between the host and target processors is many times necessary because many processors lack certain features in hardware which are required for these debugging methods. The special version of the target processor called a 'bond-out' chip provides the missing support for breakpointing and single-stepping the target processor. The 'bond-out' target processor usually resides in a pod and is connected via a large cable or umbilical cord to the target processor system in a way to make it appear that the target processor physically resides in the target processor system. The special interface circuitry between the host and the target processor also resides in the pod and allows the host to communicate with the target processor to set the target processor up for breakpointing and single stepping. The combined system is called an In-Circuit Emulator or "ICE".

Typically ICEs are expensive, costing thousands of dollars and consuming significant physical space with umbilical cords often six feet long and book-size pods in which the bond-out chip resides.

Another problem encountered with ICE solutions occurs in the case of a network of closely connected processors. In such a network there can be a large number of processor units, each dedicated to a portion of a large execution task or job. An ICE for each processor in a such a case, would prove to be exorbitantly expensive and impracticable.

Finally, a problem commonly encountered occurs when the target processor executes a program that is fixed in a Read-Only Memory (ROM) device. In such a case, it is difficult to set breakpoints in the target processor program because doing so requires alteration of the target processor program, which is not a simple process if at all even possible depending on the type of ROM device used by the target processor.

Therefore, it is desirable to reduce the cost of an ICE for a single processor and mandatory if multiple processors are involved in a system. Simple economics demands a better solution to obtaining important information from target processor in a target system when running a program in real time.

Figure 1:
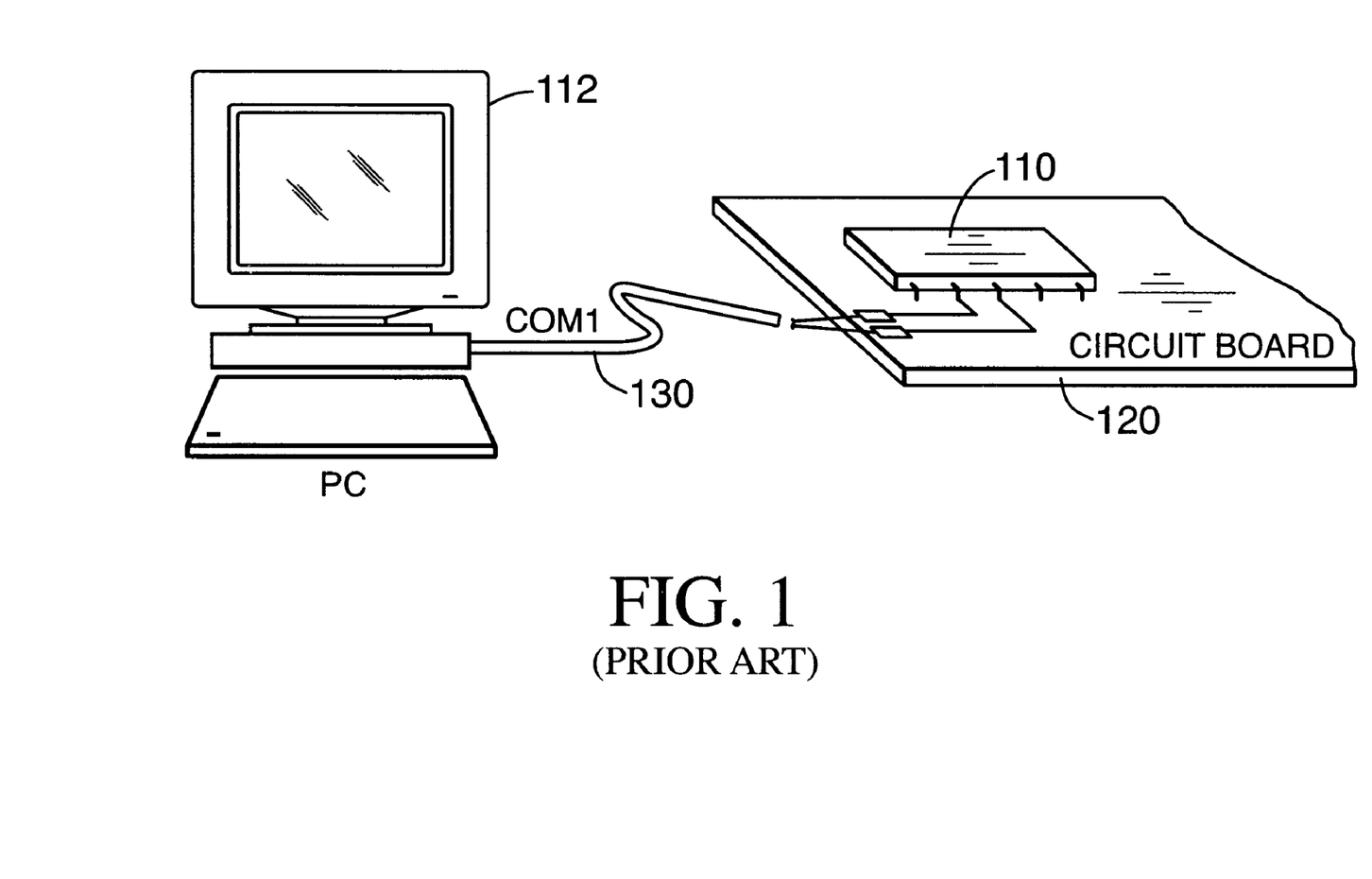
FIG. 1 shows a typical host to target connection over a dedicated communications link.

One solution that works with very slow applications is to have the target processor execute an interpreter and have a simulator on the host processor execute the program to be debugged, but send to the target processor commands that affect the I/O subsystems related to the target processor. Referring to FIG. 1, after the target processor 110 on target system circuit board 120 performs the I/O operation, it reports back to the host 112 the results of the I/O operation over a dedicated communications link 130. The host 112 keeps track of all resources, including the I/O resources, and the target processor 110 controls and senses the states of signals in the target processor system 120. If the simulation speed is fast enough for the host processor to interact correctly with the target processor system, proper results are obtained. However, for most systems, such a scheme is far too slow to interact with devices surrounding the target processor.

Thus, given the expense of an ICE and the impracticability of using such a device in multiple processor cases and given the slow speed of other solutions, it is desirable to have a method for debugging one or more processors with the processors running at their normal execution speed even if executing from a ROM and without the expense of complex ICEs.

SUMMARY OF INVENTION

A system in which the above needs can be met includes a host processor connected to at least one target processor unit having a target processor, a code memory, a shared memory, and a shared control register. Both the host and target processor can access the code memory, shared memory and shared control register so that the host can load target processor programs into the code memory, and the host processor and target processor can pass information to each other and can set and reset control flags via the shared memory. In such a system, a method according to an embodiment of the present invention includes the target processor fetching and executing an instruction from a location in a code memory based on the current instruction pointer; the target processor testing a single-step flag in the shared memory after executing the instruction; if the single step flag is not set, the target processor continuing to execute instructions; if the single-step flag is set, the target processor copying the instruction pointer into a mailbox location in shared memory; the target processor interrupting the host processor; and the target processor stopping execution of instructions. In one embodiment the target processor is a processor related to the 8051 family of processors. In another system in which the above needs can be met the host processor is the same type of processor as the target processor, and the host processor system is tightly coupled to the target processor unit to allow chains of target processor units to be constructed. In yet another embodiment according to the present invention a method of controlling execution of a target processor unit embedded in a chain of like processor units includes the steps of a head processor in the chain sending single-step control information via the intervening processor units to the processor unit immediately adjacent to and preceding the target processor unit in the chain; the immediately adjacent processor acting as the host processor for the target processor by interpreting the single-step control information to set the single-step flag in the target processor's shared memory; the target processor responding to the single-step flag in its shared memory to stop execution and copy its instruction pointer into its shared memory; the immediately adjacent processor receiving the host interrupt from the target processor and clearing the source of the interrupt; and the immediately adjacent processor sending the instruction pointer information back up the chain to the head processor in the chain.

BRIEF DESCRIPTION OF THE DRAWINGS

The foregoing and other objects, aspects and advantages will be better understood from the following detailed description of the preferred embodiments of the invention with respect to the drawings, in which.

DETAILED DESCRIPTION OF THE INVENTION

Figure 2:
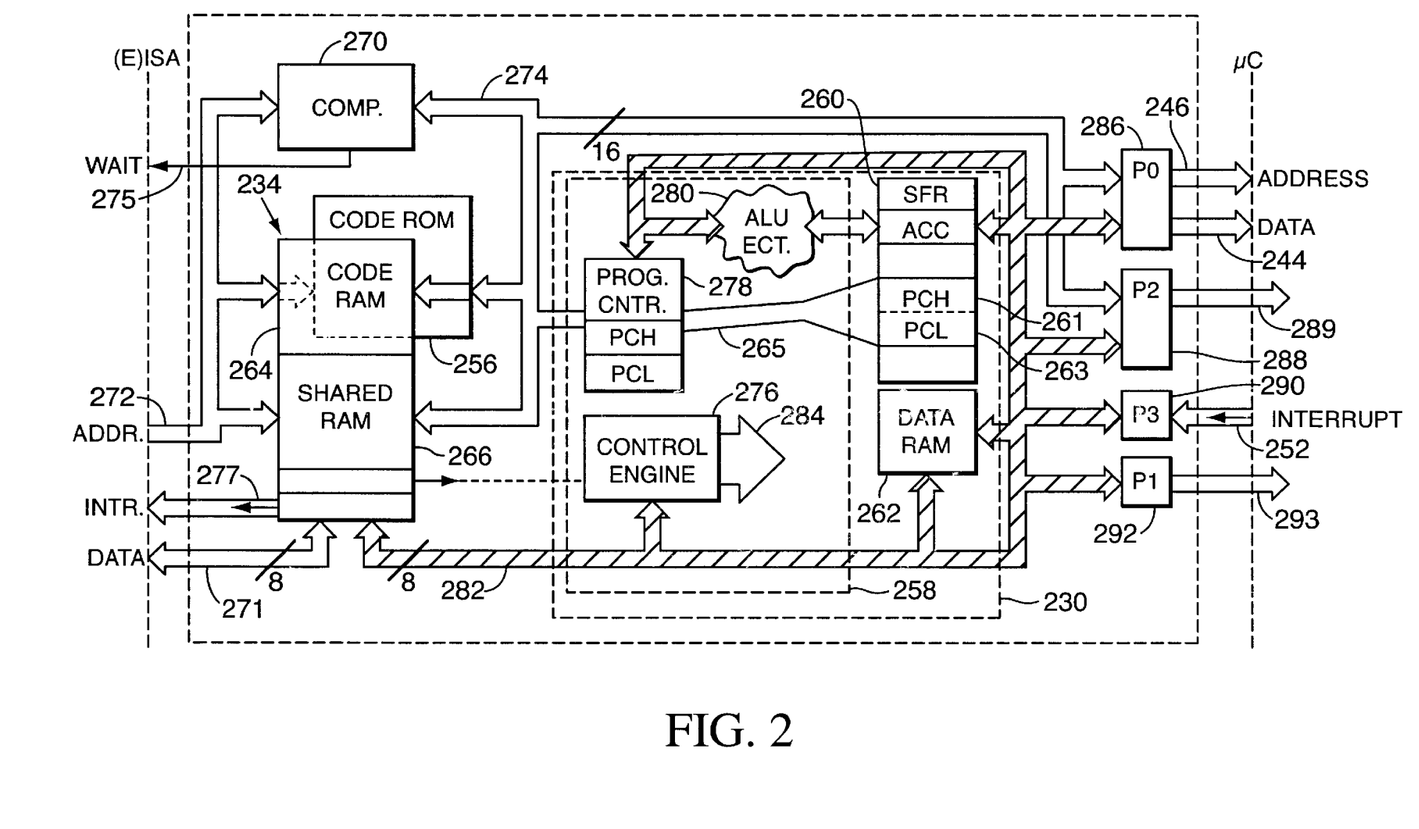
FIG. 2 shows a target processor unit on which the target program is to be debugged.

A target processor unit typical of one on which the target program is to be debugged is shown in FIG. 2. The target processor unit 269 includes a processor 230 having an internal address bus 274 and a data bus 282. In one embodiment the address bus has 16 lines and the data bus has 8 lines. The address bus 274 connects to a first address port of a code memory 264 and a shared memory 266. The data bus 282 connects to a first data port of the code memory 264 and the shared memory 266. In this embodiment the processor 230 is an 8051-type processor but as set forth in my above-identified prior filed application may include other processor configurations. The second address and data ports of the code memory 234 and the shared memory 266 connect to a host processor's address bus 272 and data bus 271 respectively so that these memories are accessible by both the target processor and the host processor. Comparator circuitry 270 compares an address generated by the target processor 230 with an address generated by the host processor on bus 272 to prevent simultaneous access to the same location in the shared memory. If such a simultaneous access occurs, the comparator circuitry asserts a wait signal on line 275 to stall the host processor. In some embodiments a read only memory (ROM) 256 is connected between the target processor's address and data bus. This ROM may contain target programs needed by the target processor or a program that is to be debugged according to the methods of the present invention.

An interrupt signal 277 to the host processor is also provided by dedicating an address of a particular location in the shared memory 266 to generate the host interrupt signal 277. In this case the particular location for generating the host interrupt signal 277 is the last location in the shared memory 266. The host side of the target processor unit is alternatively referred to as the upstream side.

A second interface is also included in the target processor unit 269. This interface, called the microcomputer bus, provides an address bus 246 and a data bus 244 and receives an interrupt signal 252. The processor data bus 282 connects to four I/O ports P0 286, P1 292, P2 288, P3 290. Two of the ports, P0 286 and P2 288, provide the address bus 246 and data bus 244 and another port, P3 290, receives the interrupt signal 252. This side of the target processor unit is alternatively referred to as the downstream side.

Figure 3:
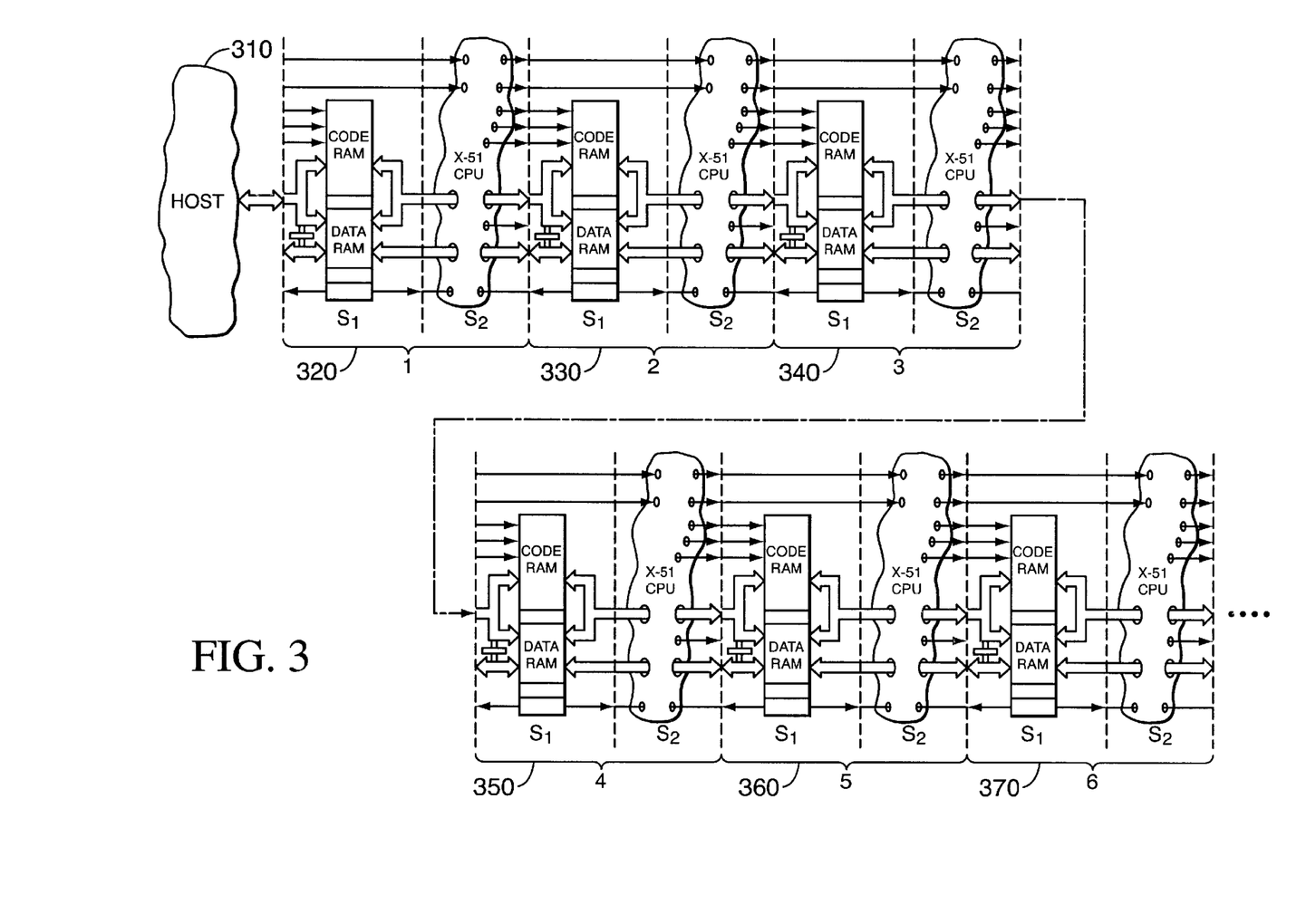
FIG. 3 shows a chain of target processor units connected to a host system.

In this embodiment, the microcontroller bus lines and the host bus lines have substantially the same signal definitions thereby permitting two or more target processor units to be connected together to form a chain, the downstream buses and interrupt of one target processor unit connecting to the upstream buses and interrupt of the next adjacent target processor unit as shown in FIG. 3. The upstream and downstream buses are both EISA, EISA-like buses or μC-like buses.

The processor 230 in the target processor unit includes a data ram 262 connected to the data bus 282 of the processor 230, and an instruction pointer register 278 which drives the address bus 274 under the control of a timing and control engine 276. The timing and control engine 276 receives a Reset signal on line 455 in FIG. 4 from the host processor to reset the target processor. The processor further includes a register set 260 connected to the processor data bus 282 and an arithmetic logic unit (alu) 280 connected between the processor data bus 282 and the register set 260. The processor 230 typically uses a portion of the data ram 262 as a stack for saving the contents of internal registers such as the instruction pointer register 278.

The target processor unit further includes a shared control register which is mapped to a specific location in the shared memory 266. This register is a physically separate register that is accessible through the address space of both the target processor 230 and the host processor which is connected to the host address bus 272 and host data bus 271. The result is that either the host or target processor can change the contents of the control register. However, when the processors read the shared control register, the contents of the mapped location in the shared memory are returned instead. This means that information in the control register can be written but not read by the host.

Figure 4:
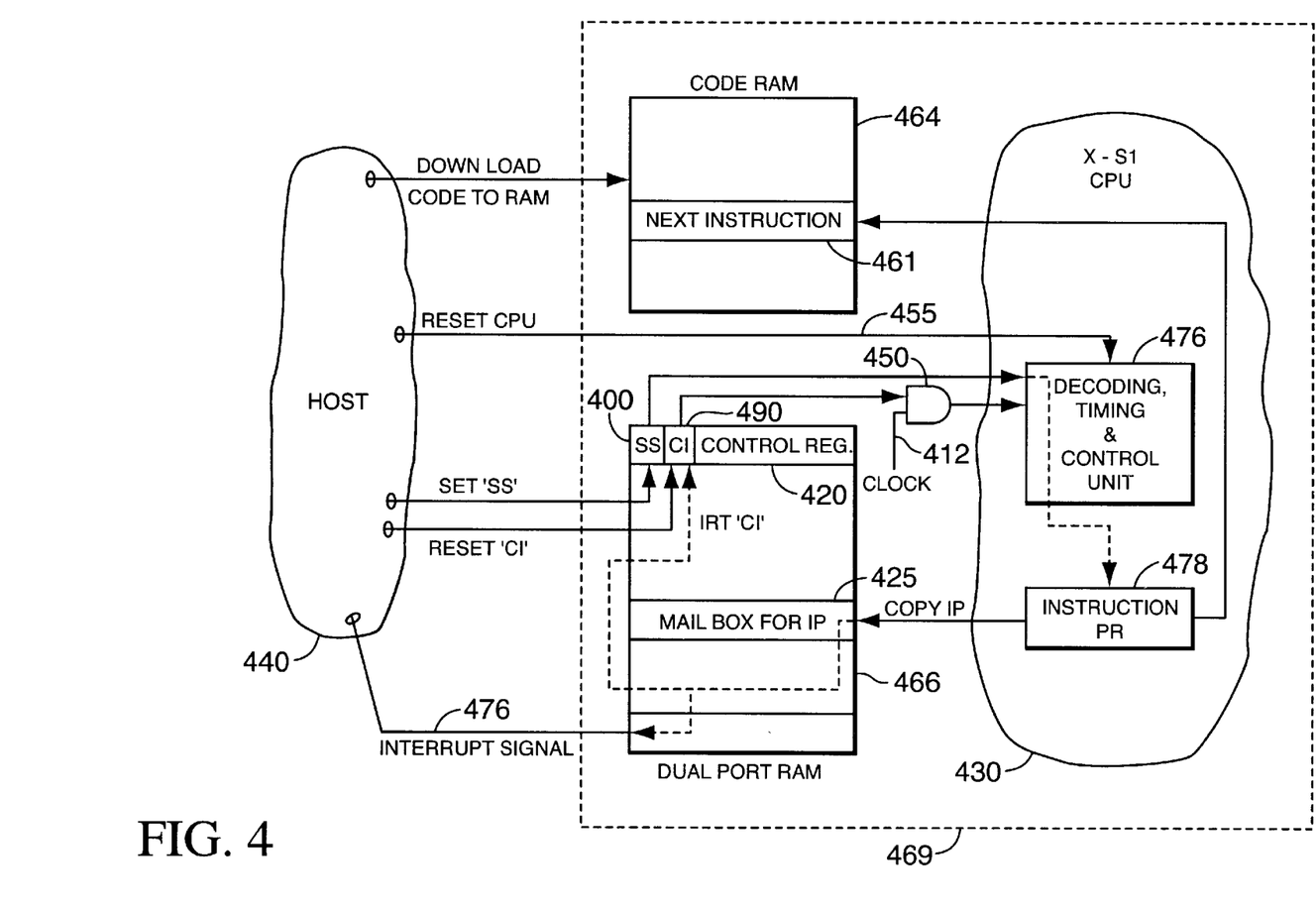
FIG. 4 is a schematic diagram illustrating software structures used in an embodiment according to the present invention.

FIG. 4 suggests the software structures and show some additional hardware structures used according to the present invention. In particular, in the shared memory 466, the shared control register 420 is shown as containing two control bits; the single step bit, SS 400 and the clock inhibit bit CI 490.

The CI bit is used to control whether an active clock signal 412 reaches the target processor 430 by means of gate 450. When the clock inhibit bit is active, the clock signal 412 does not reach the target processor, causing the target processor to stop execution. When the CI bit is inactive, the clock signal 412 is allowed through, and the target processor continues execution. The target processor makes the CI bit inactive when the processor is to stop execution after an instruction, and the host processor makes the bit active to release the target processor to continue.

The SS bit is used to control whether or not the target processor stops execution after executing a particular instruction. When the host processor 440 makes the SS bit active, the target processor 430 is informed, by testing the SS bit in the control register 420, that it should only fetch and execute the next instruction and then stop. When the host makes the bit inactive, the target processor continues to execute instructions. Because both the SS and CI bits are present in the same shared control register 420, both bits may be changed simultaneously using the proper data pattern when writing the shared control register.

Shown also in FIG. 4 is the code memory 464 which contains the instructions 461 to be executed by the target processor. In the preferred embodiment the code memory 464 is a Random Access Memory (RAM) which allows for alteration of programs otherwise contained in read-only-memory (ROM). The host processor can alter or download programs in the code memory when the target processor is stopped or held in reset by the reset line 455 which is connected from the host processor to the timing and control unit 476 of the target processor unit. Either the host processor or the target processor can access the shared memory 466 at any time but simultaneous access to the same location in shared memory causes the host processor to wait for the target processor to complete its access before proceeding.

According to FIG. 4, decoding a location in the shared memory in the target processor unit address space generates the host interrupt signal on line 476. When the target processor writes to this location it generates an interrupt to host processor. The host processor can then access the location to clear the interrupt signal.

A mailbox 425 is also shown in the shared memory 466. This is a dedicated location in the shared memory for storing the contents of the instruction pointer register 478 of the target processor. The target processor can write the current instruction pointer into this location which the host processor can then read to determine where in the program the target processor stopped. The host processor can also change the contents of this location 425. When the host processor releases the target processor to continue execution of its program, the target processor reads the mail box 425 to determine where in its program it should resume execution. Thus, if the host processor has altered the program in the code memory while the target processor was stopped, the host processor may need to provide a new instruction pointer to start the target processor in the new program.

Figure 5:
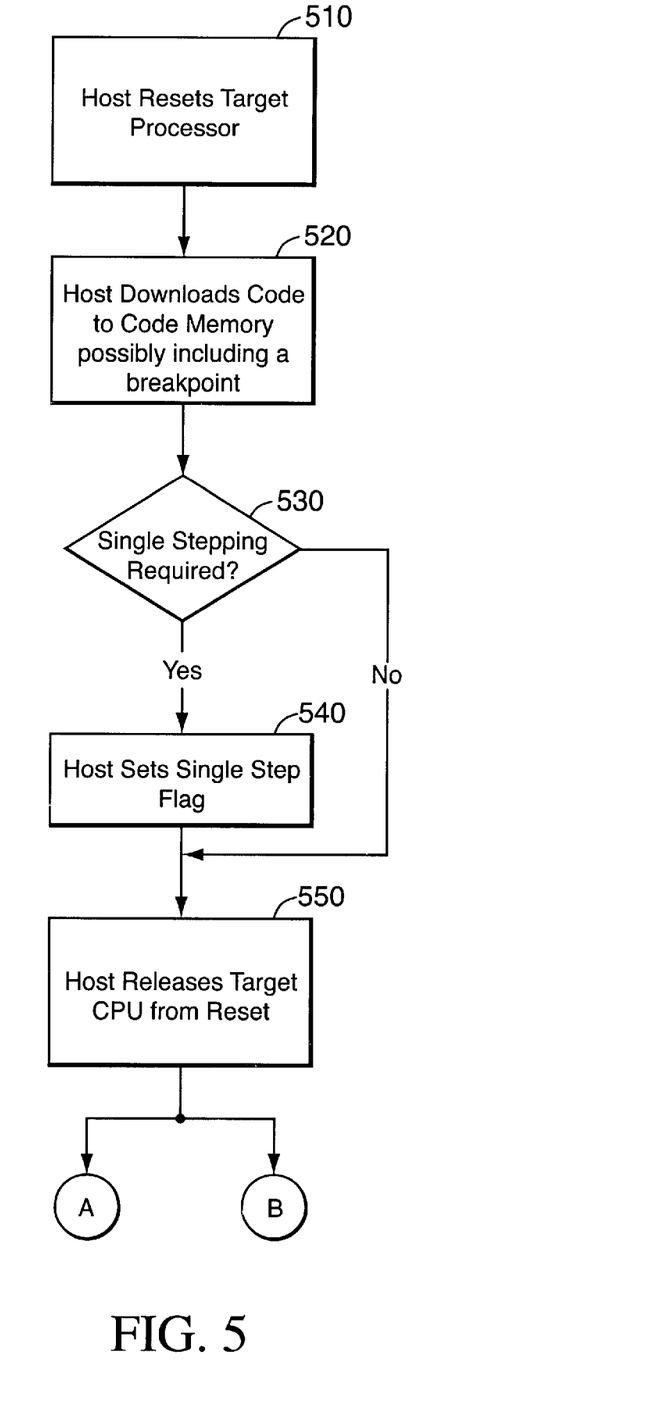
FIG. 5 is a flow chart setting forth steps to initialize the target processor code memory according to an embodiment of the present invention.

Referring now additionally to FIG. 5, the flow chart shown therein sets forth steps to initialize the target processor code memory in accordance with the present invention. According to the flow chart, in step 510 the host resets the target processor by activating its reset line 455. Then the host processor downloads a program to the code memory in step 520 by writing to the code memory 464 using the host address and data bus. The downloaded program may contain a breakpoint, which will be discussed below. The host processor will then decide whether or not single stepping is required in step 530. If not, then host will release the target processor from reset. If so, it will set the single step flag by writing to the control register 420 to make the SS bit active in step 540. The host processor then releases the target processor from the reset condition in step 550 by making the Reset signal inactive. Following this the target processor resumes execution as shown by following connector A to FIG. 6. The host processor now waits for a host interrupt in step 720. This is shown in the chart by following the connector B to FIG. 7 connector B. The actions taken in FIG. 7 are described below.

Figure 6:
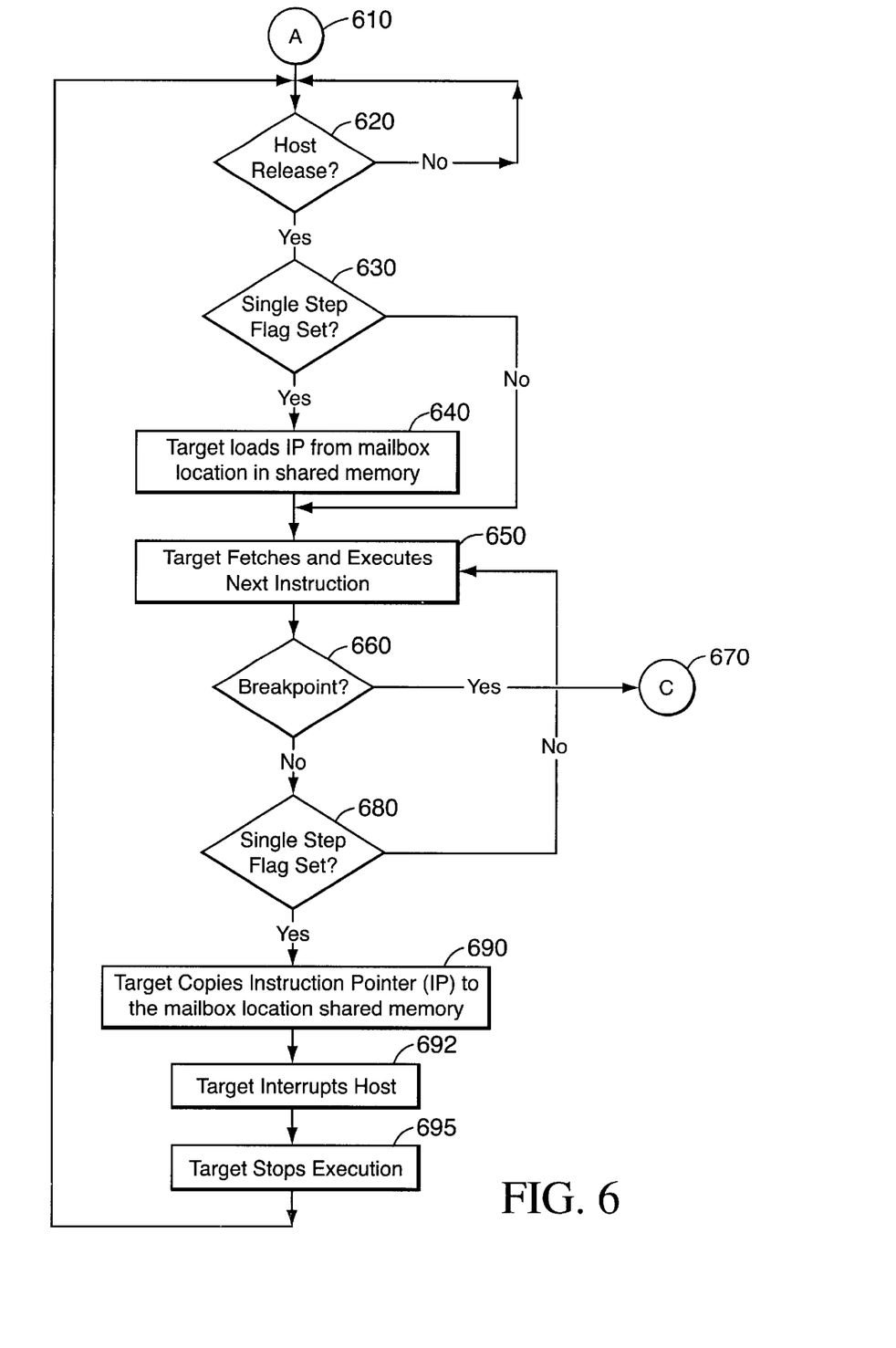
FIG. 6 shows a flow chart setting forth steps the target processor follows to respond to single-stepping according to an embodiment of the present invention.
Figure 7:
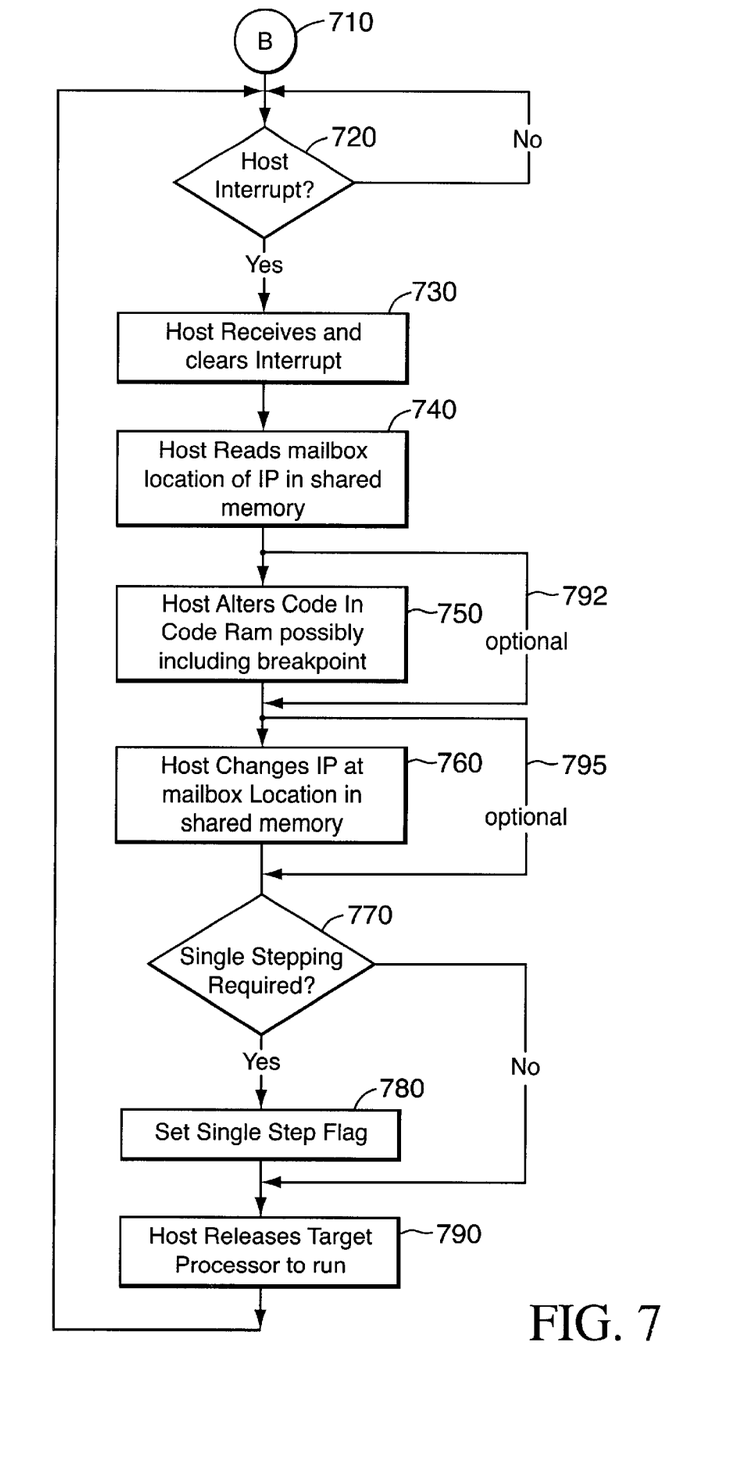
FIG. 7 is a flow chart setting forth steps the host processor follows when the target processor responds to single-stepping according to an embodiment of the present invention.

The flow chart of FIG. 6 therein sets forth steps that the target processor follows to respond to single-stepping according to the present invention. After the target processor is reset in step 510, the target processor waits to be released in step 620. Upon release, in step 630 the target processor tests the single step flag SS. If the flag is set, in step 640 the target processor loads its instruction pointer from the mailbox location in shared memory. If the flag SS is not set, then the target processor continues to step 650. In step 650 the target processor fetches and executes the instruction pointed to by the current instruction pointer. Assuming that no breakpoint was set in the program, the target processor in step 680 again tests the single step flag. If the flag is not set, program execution continues to execute instructions until a breakpoint is encountered or the single step flag is detected as active. If the flag is set, then in step 690 the target processor copies the instruction pointer (IP) to the mailbox location in the shared memory, interrupts the host processor in step 692 by writing to the host interrupt location in shared memory and stops execution in step 695 by making the CI bit active.

Thus, if the single step flag is set by the host processor, the target processor executes a single instruction at the instruction pointer and stops execution after posting its instruction pointer in the mailbox location and interrupting the host processor. As long as the single step flag remains active, each time the target processor is released by the host, the target processor will execute one instruction and stop. If the single step flag is made inactive by the host processor, the target processor continues to execute the program at normal speed until it encounters a breakpoint or an active single step flag. This latter case of the host processor setting the single step flag while the target processor is executing its program at normal speed, allows the host processor to stop the target processor, though at some unknown location in the target program. The host processor can then determine the location by reading the mailbox location.

FIG. 6 also shows the case in step 660 in which the host processor places a breakpoint into the program the target processor is to execute. Many times single stepping is not desirable until the target processor has reached a known place in the program. The details of the breakpoint mechanism are set forth in U.S. patent application Ser. No. 09/303,010, filed Apr. 30, 1999 and entitled "An Integrated Breakpoint System and Method For Tightly Coupled Processors, And Capable Of Supporting A Chain of Processors," and are briefly set forth herein.

Figure 8:
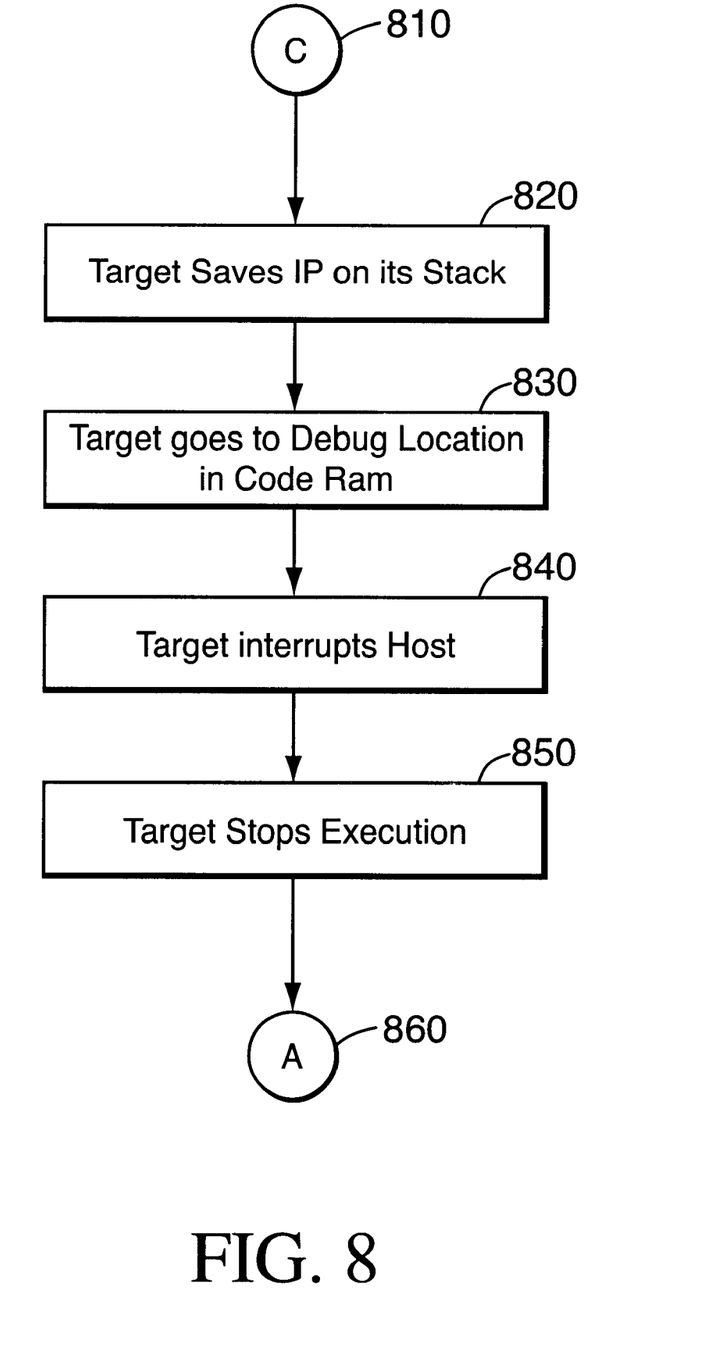
FIG. 8 shows a flow chart setting forth steps the target processor follows to respond to breakpointing according to an embodiment of the present invention.

The host processor places a breakpoint in the target program by replacing an instruction in the program with a break instruction. When the target processor fetches and executes this instruction it takes the steps that are shown in FIG. 8 which is entered via connector C from FIG. 6. In particular, in step 820 the target saves the instruction pointer at the top of a stack structure maintained by the target processor in the data ram 262 shown in FIG. 2. Next, in step 830, the target goes to a predetermined debug location in the code memory. Then the target interrupts the host in step 840 by writing to the interrupt location in the shared memory and stops execution in step 850 by making the CI bit in the control register active.

At this point the host processor begins the debugging procedure. If the host processor upon receiving the interrupt writes a return instruction to the debug location and then replaces the break instruction in the code memory with the original instruction, the target processor will execute the debug instruction and return to executing the original program at normal speed when the target processor is released. However, if the host processor sets the single step bit in the control register, the target processor will execute the return instruction and, at the completion of this instruction execution, will test the SS bit as shown in step 680 of FIG. 6, copy the instruction pointer to the mailbox location in shared memory in step 690, interrupt the host processor in step 692 and stop execution in step 695. The host processor can now use the single step mode of operation beginning at the exact location where the breakpoint in the original program was placed. Thus, the host processor allows the user to execute the program instructions up to the breakpoint location, then perform the breakpoint procedure without altering any of the target processor's resources (except the dedicated control register bit) and then switch to single step mode of operation so the user can more intensely scrutinize the program's actions.

Turning now back to FIG. 7, this figure sets forth steps the host processor follows when the target processor responds to single-stepping in accordance with the present invention. In step 720 the host processor waits for a host interrupt from the target processor. When it receives the interrupt, it clears the source of the interrupt in the interrupt location of the shared memory in step 730 and then reads the instruction pointer (IP) from the mailbox location in step 740. At this point the host processor can decide, in step 750, to alter the program in the code memory of the target processor, which alteration may include replacing an instruction in the code memory with a break instruction. If the host does not alter the target processor program, flow proceeds directly to step 760 as suggested by line 792. The host in step 760 may decide to change the instruction pointer at the mailbox location in shared memory. If the host does not alter the IP, then as indicated by line 795 flow proceeds to step 770. In this step the host processor decides if it should enable single-stepping and if so sets the single step flag in step 780. In step 790 the host processor releases the target processor to run. It is noted that because the SS bit and the CI bit are in the same shared control register, the host processor can simultaneously set the single step bit and clear the CI bit even though these steps are shown sequentially in the flow chart.

As discussed above, the upstream and downstream bus interface of the target processor unit permit the target processor units to be connected together in a chain-like fashion according to FIG. 3 wherein six target processor units 320, 330, 340, 350, 360, 370 are connected into a chain. The head processor unit 320 in the chain is the target processor unit connected to a host computer system 310. The target processor to be debugged can be in any one target processor unit in the chain, say, for example, the fourth target processor unit 350. The upstream processor unit immediately adjacent to the target processor unit to be debugged, the third target processor unit 340 in this example, in effect acts as the host processor for that target processor for the single stepping and breakpointing processes described above. Other target processor units in the upstream portion of the chain, the first target processor unit 320 and second target processor unit 330 in the example, act as agents for relaying information between the host computer system 310 and the target processor unit to be debugged 350. A clock for the processors is propagated down the chain and is configured so that a target processor making its CI bit active stops only that processor. Other target processor clocks downstream are not inhibited. However, if a particular target processor is stopped, downstream target processors are not able to pass information upstream to the host computer system. 310. This means that preferably only one target processor in the chain is stopped at a time and then only for a brief period of time.

Figure 9:
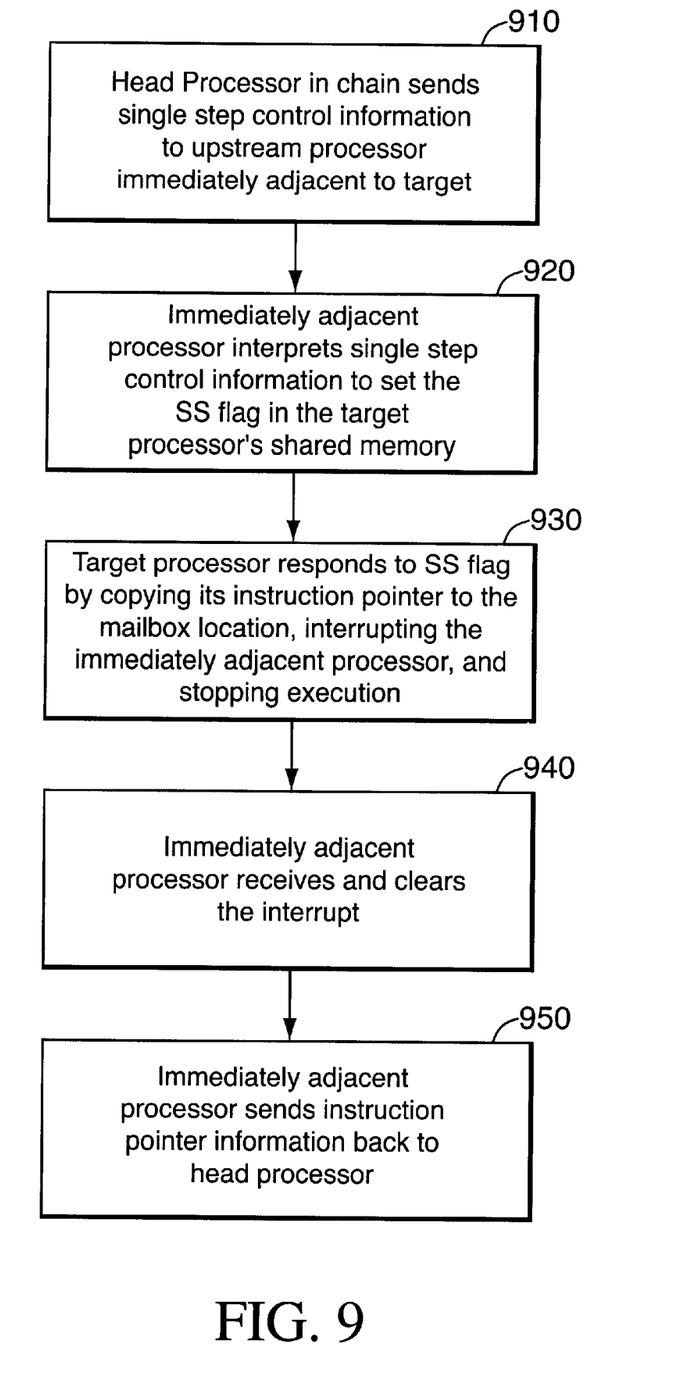
FIG. 9 shows a flow chart setting forth steps a head processor, an immediately adjacent processor and a target processor follow to allow single-stepping of a target processor unit embedded in a chain of processor units according to an embodiment of the present invention.

Turning to FIG. 9, this figure shows a flow chart setting forth steps a head processor, an upstream immediately adjacent processor unit and a target processor unit follow to allow single-stepping of a target processor units embedded in a chain of processor units according to an embodiment of the present invention. In step 910 the head processor in the chain sends single step control information to the upstream immediately adjacent processor to the target processor to be debugged. This information is relayed by the intervening processor units between the head processor unit and the immediately adjacent processor unit. The immediately adjacent processor in step 920 then interprets the single step control information to set the single step flag in the target processor's shared memory. The target processor responds to the single step flag according to the steps set forth in FIG. 6 as described above, i.e., in step 930 by copying its instruction pointer to the mailbox location, interrupting the immediately adjacent processor and stopping execution. The immediately adjacent processor then receives and clears the interrupt in step 940 and passes the instruction pointer and possibly other information up to the head processor in step 950. In this way each target processor in a chain of target processor units can be debugged while each is operating in the circuitry of their respective target processor systems.

It is noted that while the target processor shown in some embodiments is a 8051-like processor, the target processor does not depend upon the particular instruction set, register complement, or other 8051 compatible features, but will work with any instruction set and internal architecture that is capable of supporting the extension included in the target processor unit, i.e., the shared memory, code memory, the shared control register and the interrupts and the bus structures that allow a chain to be formed. Therefore the above described single step mechanism will work for any processor or processor chain that couples to a host as described herein.

While the invention has been described in terms of one or more preferred embodiments, those skilled in the art will recognize that the invention can be practiced with modification within the spirit and scope of the appended claims.

What I claim:

1. In a computing system including a host processor connected to at least one target processor unit having a target processor, a code memory, a shared memory, and a shared control register, wherein the code memory, shared memory and shared control register are accessible by the host and target processor, a method for controlling the execution of a target processor with a host processor, comprising the steps of:

(a) causing the target processor to fetch and execute an instruction from a location in the code memory, the location being identified by a current instruction pointer stored in the instruction pointer register in the target processor;

(b) causing the target processor to test a single-step flag in the control register after the execution of the instruction;

(i) if the single-step flag is not set (c) causing the target processor to return to step (a);

(ii) if the single-step flag is set, (d) causing the target processor to copy the instruction pointer of the processor into a mailbox location in the shared memory;

(e) causing the target processor to interrupt the host processor; and (f) causing the target processor to stop execution of instructions.

2. A method as recited in claim 1, further comprising the steps of prior to step (a), (g) causing the target processor to test the single-step flag; and (iii) if the single-step flag is set, (h) causing the target processor to copy an instruction pointer from the mailbox location in shared memory into the instruction pointer register of the processor.

3. A method as recited in claim 2, further comprising the steps of: prior to step (g), (j) causing the target processor to wait to be released to execute instructions; and (k) when released, causing the target processor to continue at step (g).

4. A method as recited in claim 3, further comprising the steps of: prior to step (j), (l) causing the host to reset the target processor;

(m) causing the host to download a program to the code memory for the target processor to execute;

(n) causing the host to determine whether or not single-stepping is required;

(o) causing the host processor to release the target processor to execute instructions; and (iv) if single-stepping is required, (p) causing the host processor to set the single-step flag concurrently with the step of releasing the target processor.

5. A method as recited in claim 3, further comprising the steps of: subsequent to step (e), (l) causing the host processor to detect an interrupt from the target processor;

(m) causing the host processor to clear the source of the interrupt;

(n) causing the host processor to read the copied instruction pointer at the mailbox in the shared memory;

(o) causing the host processor to determine whether or not single-stepping is required;

(p) causing the host processor to release the target processor to run; and (iv) if single-stepping is required, (q) causing the host processor to set the single-step flag concurrently with the step of releasing the target processor.

6. A method as recited in claim 5, further comprising the steps of: subsequent to step (n) and prior to step (p), (r) causing the host processor to alter the program in the code memory that the target processor is to execute; and (s) causing the host processor to change the copied instruction pointer at the mailbox location in shared memory.

7. A method as recited in claim 5, further comprising the step of: subsequent to step (n) and prior to step (p), (r) causing the host processor to set a breakpoint at a location in the code memory.

8. A method as recited in claim 1, further comprising the steps of: if the instruction executed in step (a) is a break instruction, (g) causing the target processor to save the instruction pointer for later retrieval;

(h) causing the target processor to jump to a debug location in the code memory;

(j) causing the target processor to interrupt the host processor; and (k) causing the target processor to stop execution.

9. A method as recited in claim 1, further comprising the steps of: prior to step (a), (g) causing the target processor to wait to be released to execute instructions; and (h) when released, causing the target processor to continue at step (a).

10. A method as recited in claim 1, wherein the code memory is a random access memory.

11. A method as recited in claim 1, wherein the code memory can be accessed by the host when the target processor is stopped.

12. A method as recited in claim 1, wherein the single-step flag is a single-step bit in the shared control register which is mapped into a predetermined address in the address space of the shared memory.

13. A method as recited in claim 12, wherein the host can set or clear the single-step bit by writing a data pattern to the predetermined address for the shared control register in the shared memory.

14. A method as recited in claim 1, wherein the step of causing the target processor to stop execution of instructions is performed by the target processor setting a clock inhibit bit in the shared control register which is mapped into a predetermined address in the address space of the shared memory; and wherein the clock inhibit bit when set stops the clock to the target processor.

15. A method as recited in claim 14, wherein the host processor releases the target processor by writing a data pattern to the predetermined address for the shared control register in the shared memory to clear the clock inhibit bit.

16. A method as recited in claim 1, wherein the target processor includes an 8051-like processor.

17. A method as recited in claim 1, wherein the host processor includes an 8051-like processor.

18. A method as recited in claim 1, wherein the target processor has a bus interface for connecting to a first address and data port of the code memory and a first address and data port of the shared memory; and wherein the host processor has an interface connected to a second address and data port of the code memory and a second address and data port of the shared memory.

19. A method as recited in claim 1, wherein step (e) is performed by setting an interrupt bit in the shared register mapped into a predetermined address in the address space of the shared memory.

20. A method as recited in claim 19, wherein the host can clear the interrupt bit by writing a data pattern into the predetermined address for the interrupt bit in the shared memory.

21. A method as recited in claim 1, wherein the shared memory is a dual-port memory.

22. A method as recited in claim 1, wherein the code memory is a dual-port memory.

23. A method as recited in claim 1, wherein the shared memory and the code memory are portions of the same dual-port memory.

24. In a computing system including a host processor connected to at least two target processor units connected together into a chain, each target processor unit having a target processor, a code memory, a shared memory and a shared control register, wherein the code memory, shared memory and shared control register are accessible by the target processor and an upstream immediately adjacent processor, a method of controlling execution of a target processor unit, comprising the steps of:

causing a head processor in the chain to send single-step control information via any intervening processors to the upstream, immediately adjacent processor to the target processor;

causing the immediately adjacent processor to act as the host processor for the target processor by interpreting the single-step control information to set the single-step flag in the target processor's shared memory;

causing the target processor to respond to the single-step flag in its shared memory and to copy its instruction pointer into its shared memory, interrupt the immediately adjacent processor and stop execution;

causing the immediately adjacent processor to receive the host interrupt from the target processor and to clear the source of the interrupt; and causing the immediately adjacent processor to send the instruction pointer information back up the chain to the head processor in the chain.

* * * * *

UNITED STATES PATENT AND TRADEMARK OFFICE
CERTIFICATE OF CORRECTION

PATENT NO. : 6,425,122 B1  Page 1 of 2
APPLICATION NO. : 09/339010
DATED : July 23, 2002
INVENTOR(S) : Edwin E. Klingman It is certified that error appears in the above-identified patent and that said Letters Patent is hereby corrected as shown below:

On the face of the issued patent, in the section labeled Related U.S. Application Data page at item [63], please delete: "Continuation-in-part of application No. 09/303,010, filed on Apr. 30, 1999, which is a continuation-in-part of application No. 08/925,991, filed on Sep. 9, 1997, now Pat. No. 6,021,453, which is a continuation-in-part of application No. 08/846,118, filed on Apr. 24, 1997, now Pat. No. 5,860,021, which is a continuation-in-part of application No. PCT/US98/08224, filed on Apr. 23, 1998.", and replace with -- Continuation-in-part of application No. 09/303,010, filed on Apr. 30, 1999, which is a continuation-in-part of application No. 08/925,991, filed on Sep. 9, 1997, now Pat. No. 6,021,453, which is a continuation-in-part of application No. 08/846,118, filed on Apr. 24, 1997, now Pat. No. 5,860,021 --.

At col. 1, lines 6-26, please delete "This application is a continuation-in-part of prior U. S. application Ser. No. 09/303,010, filed Apr. 30, 1999 and entitled "An Integrated Breakpoint System and Method For Tightly Coupled Processors, And Capable Of Supporting A Chain of Processors," which is a continuation-in-part of prior U.S. application Ser. No. 08/925,991 filed on Sep. 9, 1997, and entitled "A Microprocessor Unit For Use in An Indefinitely Extensible Chain of Processor with Self-Propagation Of Code and Data From The Host End, Self-Determination Of Chain Length and ID, (And With Multiple Orthogonal Channels and Coordination Ports)," which is a continuation-in-part of U.S. application Ser. No. 08/846,118, filed Apr. 24, 1997 (now U.S. Pat. No. 5,860,021) and its corresponding International Application No. PCT/US98/08224, filed Apr. 23, 1998, entitled "Single Chip Microcontroller Having Downloadable Memory Organization Supporting "Shadow" Personality, Optimized For Bi-Directional Data Transfers Over a Communication Channel" all of which applications are incorporated herein by reference.", and replace with -- This application is a continuation-in-part of prior U. S. application Ser. No. 09/303,010, filed Apr. 30, 1999 and entitled "An Integrated Breakpoint System and Method For Tightly Coupled Processors, And Capable Of Supporting A Chain of Processors," which is a continuation-in-part of prior U.S. application Ser. No. 08/925,991 filed on Sep. 9, 1997, and entitled "A Microprocessor Unit For Use in An Indefinitely Extensible Chain of Processor with Self-Propagation Of Code and Data From The Host End, Self-Determination Of Chain Length and ID, (And With Multiple Orthogonal Channels and Signed and Sealed this
Twenty-sixth Day of July, 2011

David J. Kappos
*Director of the United States Patent and Trademark Office*

Coordination Ports)," which is a continuation-in-part of U.S. application Ser. No. 08/846,118, filed Apr. 24, 1997 (now U.S. Pat. No. 5,860,021) all of which applications are incorporated herein by reference. --.